(12) United States Patent
Mortland (10) Patent No.: US 11,447,232 B2
(45) Date of Patent: Sep. 20, 2022

(54) LINKAGE ASSEMBLIES FOR AIRCRAFT WING HINGED PANELS

(71) Applicant: The Boeing Company, Chicago, IL (US)

(72) Inventor: Michael T. Mortland, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 16/178,089

(22) Filed: Nov. 1, 2018

(65) Prior Publication Data

US 2020/0140061 A1 May 7, 2020

(51) Int. Cl.
*B64C 9/02* (2006.01)
*B64C 9/04* (2006.01)
*B64C 3/18* (2006.01)

(52) U.S. Cl.
CPC ............... *B64C 9/02* (2013.01); *B64C 9/04* (2013.01); *B64C 3/18* (2013.01)

(58) Field of Classification Search
CPC .................................... B64C 9/02; B64C 9/04
See application file for complete search history.

(56) References Cited

U.S. PATENT DOCUMENTS

| 2,282,516 | A | 5/1942 | Gropler et al. | |
|---|---|---|---|---|
| 3,874,617 | A | 4/1975 | Johnson | |
| 8,511,608 | B1 * | 8/2013 | Good | B64C 9/18 244/99.3 |
| 2005/0116115 | A1 | 6/2005 | Perez-Sanchez | |
| 2014/0145039 | A1 | 5/2014 | Beyer et al. | |
| 2019/0055005 | A1 * | 2/2019 | Young | B64C 13/28 |
| 2019/0112027 | A1 * | 4/2019 | Ahern | B64C 9/16 |
| 2019/0161165 | A1 * | 5/2019 | Milligan | B64C 9/02 |
| 2019/0176962 | A1 * | 6/2019 | Kordel | B64C 9/20 |
| 2020/0047874 | A1 * | 2/2020 | Bowers | B64C 3/50 |

FOREIGN PATENT DOCUMENTS

| EP | 2669189 | 12/2013 |
|---|---|---|
| EP | 2738087 A2 | 6/2014 |
| EP | 2738087 A3 | 6/2017 |

OTHER PUBLICATIONS

European Patent Office, "Extended European Search Report", issued in connection with European Application No. 19206422.8, dated Apr. 7, 2020, 7 pages.

* cited by examiner

*Primary Examiner* — Jessica B Wong
(74) *Attorney, Agent, or Firm* — Hanley, Flight & Zimmerman, LLC (57) ABSTRACT

Linkage assemblies for aircraft wing hinged panels are described herein. An example linkage assembly includes a flap follower arm coupled between a spoiler support beam and a flap, a rocker, a panel link coupled between the hinged panel and the rocker, and a cross-bar link coupled between the flap follower arm and the rocker. The flap follower arm, the rocker, the panel link, and the cross-bar link are configured to coordinate adjustment of positions of the hinged panel and the flap relative to each other.

12 Claims, 12 Drawing Sheets

LINKAGE ASSEMBLIES FOR AIRCRAFT WING HINGED PANELS

FIELD OF THE DISCLOSURE

This disclosure relates generally to aircraft and, more particularly, to linkage assemblies for aircraft wing hinged panels.

BACKGROUND

Fixed wing aircraft commonly employ high lift devices, sometimes referred to as auxiliary airfoils, along the leading and trailing edges of the wings. These high lift devices are actuated to extend outward from the wing to change the aerodynamic lift of the wing during takeoff and landing. For example, flaps are a common type of high lift device that are movably coupled along the trailing edge of a wing. The flaps may be moved outward and/or tilted downward from the trailing edge of the wing to change the shape of the wing to generate more or less lift. The flaps are often deployed during takeoff and landing, for instance, to generate more lift at lower speeds.

SUMMARY

Disclosed herein is an example linkage assembly for coupling a hinged panel of an aircraft wing and a flap of the aircraft wing. The linkage assembly includes a flap follower arm coupled between a spoiler support beam and the flap, a rocker, a panel link coupled between the hinged panel and the rocker, and a cross-bar link coupled between the flap follower arm and the rocker. The flap follower arm, the rocker, the panel link, and the cross-bar link are configured to coordinate adjustment of positions of the hinged panel and the flap relative to each other.

An example aircraft wing disclosed herein includes a fixed wing portion having a spoiler support beam, a flap moveably coupled to the fixed wing portion, the flap moveable between a stowed position and a deployed position, a hinged panel rotatably coupled to the spoiler support beam, and a linkage assembly operatively coupling the flap and the hinged panel such that movement of the flap causes movement of the hinged panel. The linkage assembly includes a flap follower arm coupled between the spoiler support beam and the flap. At least a portion of the flap follower arm moves in an inboard or outboard direction as the flap is moved between the stowed position and the deployed position.

An example aircraft disclosed herein includes a wing including a spoiler support beam, a flap, a hinged panel rotatably coupled to the spoiler support beam, and a linkage assembly operatively coupling the flap and the hinged panel. The linkage assembly includes a flap follower arm coupled to the spoiler support beam, a rocker coupled to the spoiler support beam inboard or outboard of the flap follower arm, a cross-bar link coupled between the flap follower arm and the rocker, and a panel link coupled between the rocker and the hinged panel.

BRIEF DESCRIPTION OF THE DRAWINGS

The figures are not to scale. Instead, the thickness of the layers or regions may be reduced or enlarged in the drawings. In general, the same reference numbers will be used throughout the drawing(s) and accompanying written description to refer to the same or like parts.

DETAILED DESCRIPTION

Disclosed herein are example linkage assemblies that operatively couple a hinged panel (sometimes referred to as a drooped panel) of an aircraft wing and a flap of the aircraft wing. Example linkage assemblies slave the motion of the hinged panel to the motion of the flap. Example linkage assemblies disclosed herein consume less vertical space in the cove of an aircraft wing while still enabling high-fowler flap motion. By consuming less vertical space in the cove of the wing, the example linkage assemblies can be used in thinner, lighter wings, which provide more efficient flight.

In general, fixed wing aircraft typically include one or more flaps along a trailing edge of a wing that are deployed aft and/or downward to change the shape of the wing. Flaps that translate aft and rotate downward are commonly referred to as fowler flaps, and may have a relatively high-fowler flap motion. In some instances, a hinged panel (commonly referred to as a drooped panel) is disposed fore of the flap and is rotated downward as the flap is deployed to produce smooth airflow over and under the wing. Instead of employing a separate actuator to move the hinged panel downward, a linkage assembly may be used to slave the motion of the hinged panel to the motion of the flap. In particular, as the flap is moved from the stowed position to the deployed position (via an actuation system), the linkage assembly rotates the hinged panel from an upward (or neutral) position to a downward position, and vice versa.

Known linkage assemblies utilize a bell crank and a plurality of links that are operatively coupled between the flap and the hinged panel. The bell crank and links are aligned along a chord of the wing between a fixed wing structure and the flap. The known linkage assembly moves between a folded configuration when the flap is stowed and an expanded configuration when the flap is deployed. Because of the relatively high flap motion seen in fowler flaps, the bell crank and links are relatively long. As a result, when the flap is stowed and the linkage assembly is in the folded configuration, the linkage assembly consumes a significant amount of vertical space in the cove of the wing. Therefore, accommodating this known linkage assembly requires a relatively thick wing. Thicker wings are heavier and, thus, reduce flight efficiency.

The example linkage assemblies disclosed herein consume less vertical space within a cove of a wing, thereby enabling high-fowler flap motion to be implemented in thinner, lighter wings where space is limited. The example linkage assemblies utilize an arrangement where at least a portion of the linkage assembly members move in a more lateral, or inboard/outboard direction. As such, the example linkage assemblies do not require a significant vertical height like the above-noted known linkage assemblies to accomplish high-fowler flap motion.

An example linkage assembly disclosed herein includes a flap follower arm coupled between a fixed wing structure, such as a spoiler support beam, and a flap. The example linkage assembly also includes a rocker that is coupled to the fixed wing portion. The example linkage assembly further includes a cross-bar link and a panel link. The cross-bar link is coupled between the flap follower arm and the rocker, and the panel link is coupled between a hinged panel and the rocker. The rocker is disposed inboard or outboard of the flap follower arm (i.e., closer to or further from the fuselage than the flap follower arm). The example linkage assembly moves between a folded state and an expanded or unfolded state as the flap is deployed. In the folded state, the flap follower arm and the cross-bar link are disposed in a generally lateral orientation (in the inboard/outboard direction) along the fixed wing structure. As the flap is moved (via an actuator) from the stowed position to the deployed position, the flap follower arm extends outward (aft) with the flap. A portion of the movement of the flap follower arm is also in the inboard or outboard direction. The movement of the flap follower arm moves the cross-bar link, which rotates the rocker. As the rocker rotates, the rocker pulls the panel link to rotate the hinged panel downward. When the flap is moved from the deployed position to the stowed position, the opposite sequence of movements occur. Thus, the flap follower arm, the rocker, the panel link, and the cross-bar link are configured to coordinate adjustment of positions of the hinged panel and the flap relative to each other. The example linkage assembly converts relatively large motion in the flap to relatively small motion in the hinged panel.

Figure 1:
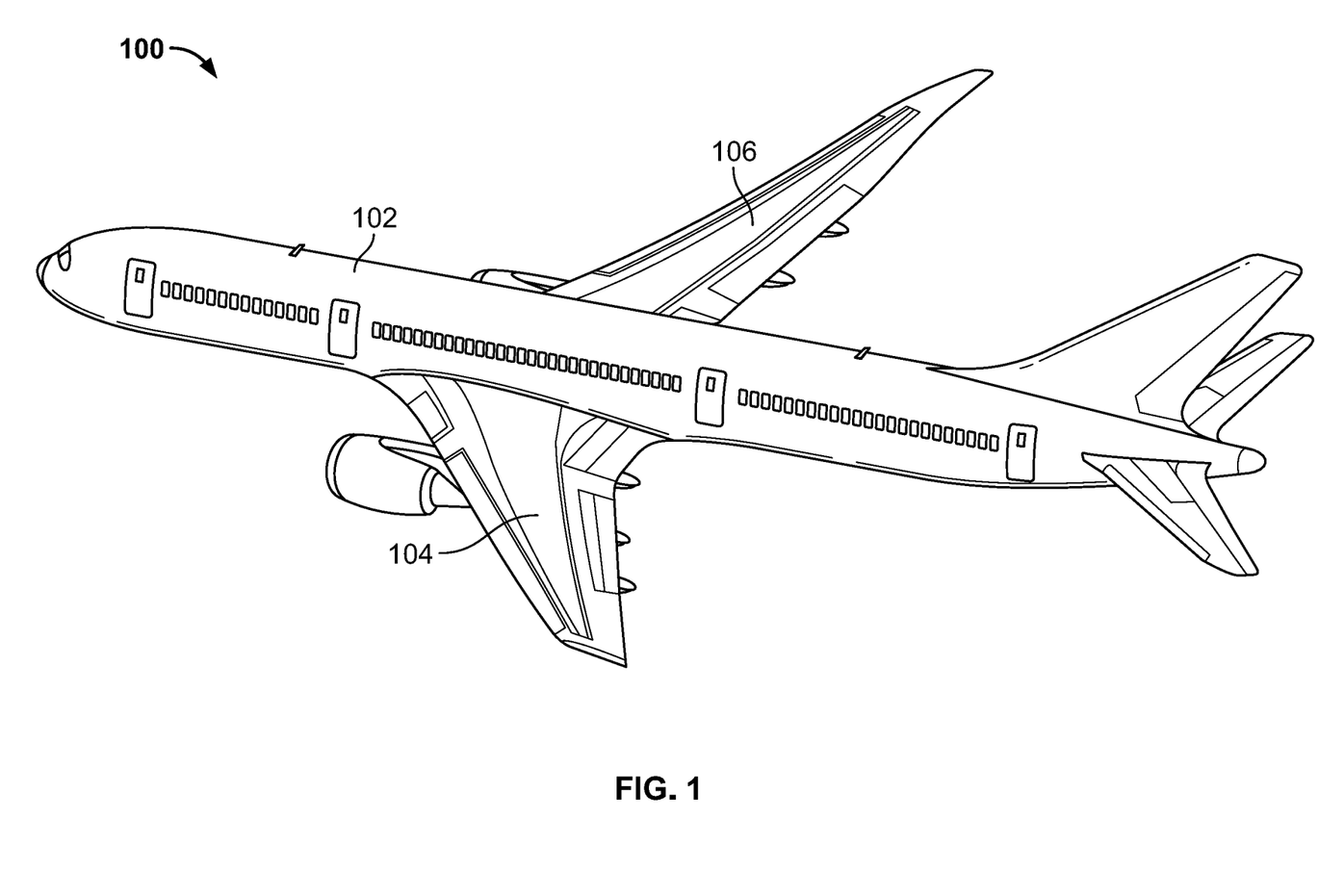
FIG. 1 illustrates an example aircraft in which the examples disclosed herein may be implemented.

Now turning to the figures, FIG. 1 illustrates an example aircraft 100 in which the examples disclosed herein may be implemented. In the illustrated example, the aircraft 100 includes a fuselage 102, a first wing 104 coupled to the fuselage 102, and a second wing 106 coupled to the fuselage 102. The first and second wings 104, 106 may have one or more control surfaces such as high lift devices that are located along the leading and trailing edges of the first and second wings 104, 106. Such high lift devices may be displaced or extended from the leading or trailing edges of the first and second wings 104, 106 to change the aerodynamic lift of the aircraft 100 and are typically used during takeoff and landing. For example, when extended from the first and second wings 104, 106, the high lift devices increase the effective size, curvature camber, and area of the first and second wings 104, 106, thereby increasing the lift of the first wing 104.

Figure 2:
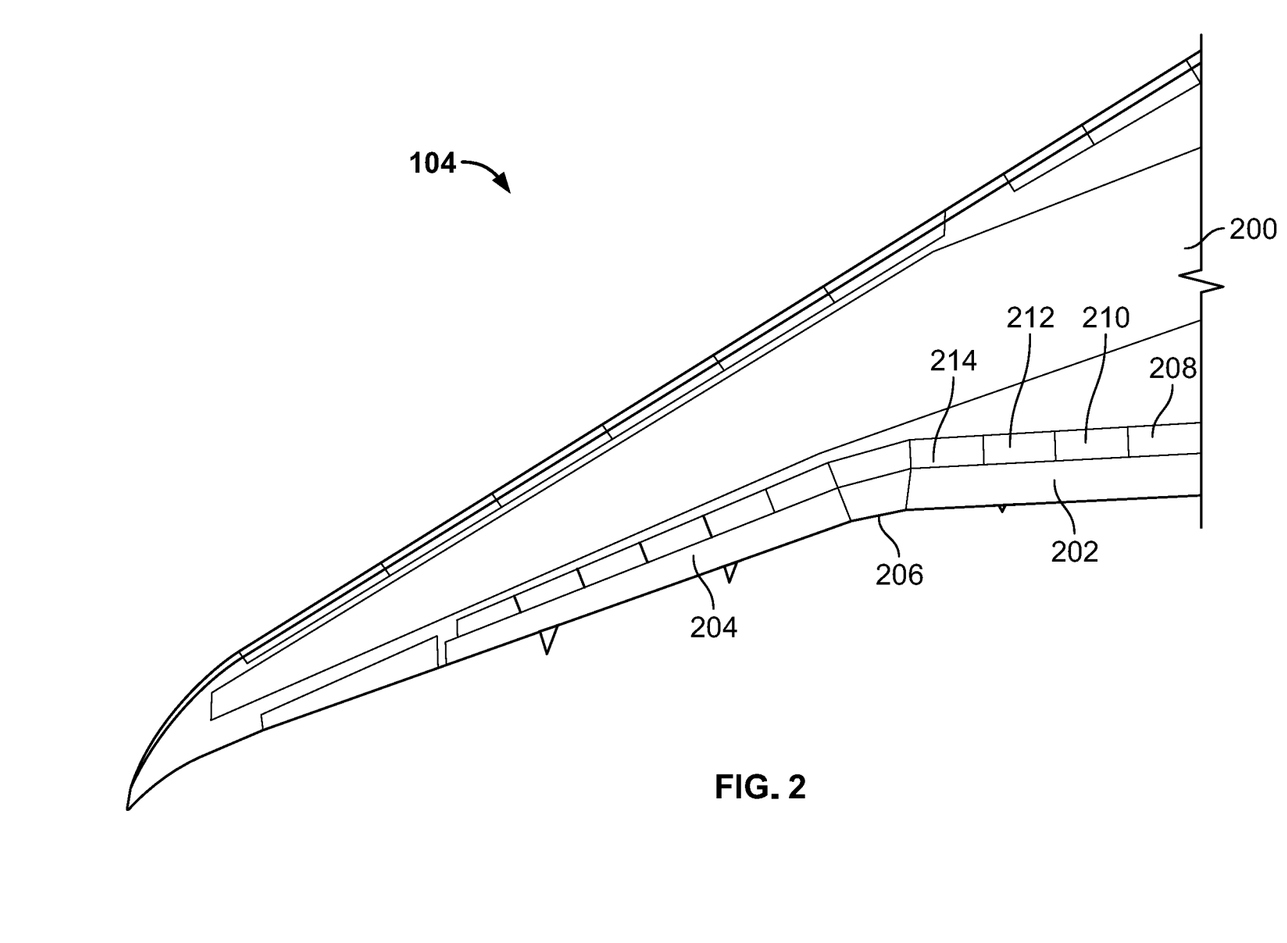
FIG. 2 is a top view of an example wing of the example aircraft of FIG. 1 having an example flap and an example hinged panel.

FIG. 2 is a top view of the first wing 104. In the illustrated example, the first wing 104 has a fixed wing structure or portion 200 and a first flap 202 (an inboard flap) and a second flap 204 (an outboard flap) that are disposed along a trailing edge 206 of the fixed wing portion 200. In other examples, the first wing 104 may include only one flap (e.g., only the first flap 202) or more than two flaps. The first and second flaps 202, 204 are moveably coupled to the fixed wing portion 200. In particular, each of the first and second flaps 202, 204 is moveable between a stowed or retracted position, as shown in FIG. 2, and an extended or deployed position. In the deployed position, the first and second flaps 202, 204 are moved aft and/or downward relative to the trailing edge 206 to change the shape of the first wing 104, which is advantageous during takeoff and landing, for example. Similarly, the second wing 106 (FIG. 1) may include one or more flaps. It is understood that any of the examples disclosed herein in connection with the first wing 104 can likewise be applied to the second wing 106. Thus, to avoid redundancy, a description of the second wing 106 is not provided herein.

The first wing 104 may include one or more hinged panels (which may also be referred to as spoilers) disposed along a top surface of the first wing 104. For example, the first wing 104 of FIG. 2 includes a first hinged panel 208, a second hinged panel 210, a third hinged panel 212, and a fourth hinged panel 214. The hinged panels 208-214 that are located fore of the first flap 202. The hinged panels 208-214 are rotatably (e.g., hingeably) coupled to a spar or spoiler support beam in the fixed wing portion 200. One or more of the hinged panels 208-214 may be rotated (e.g., via one or more corresponding actuators) upward from the fixed wing portion 200 to disrupt the airflow over the top of the first wing 104, such as during landing. One or more hinged panels can also be disposed fore of the second flap 204. Any of the description of the hinged panels 208-214 in connection with the first flap 202 can likewise be applied to the spoilers in connection with the second flap 204.

In some instances, one or more of the hinged panels 208-214 are rotatable downward when the first flap 202 is moved to the extended position to form a relatively smooth surface above and below the first wing 104 (e.g., by reducing (e.g., minimizing) the size of the gap between the trailing edge of the hinged panel and the top surface of the first flap 202). In some examples, rather than employing an actuator to rotate a hinged panel downward, a linkage assembly is used to couple the hinged panel to the first flap 202, such that as the first flap 202 is extended (e.g., via a flap actuator), the respective hinged panel is rotated downward (e.g., slaved to the first flap 202). This type of hinged panel is commonly referred to as a drooped panel. Example linkage assemblies for operatively coupling a hinged panel and a flap are disclosed in detail herein. In some examples, only certain ones of the hinged panels 208-214 operate as drooped panels, while other ones of the hinged panels 208-214 are independently actuated via an actuator. For example, in some instances, the first hinged panel 208 is a drooped panel (sometimes referred to as an inboard drooped panel (IDP)) that is coupled via a linkage assembly to the first flap 202, while the second, third, and fourth hinged panels 210-214 are independently actuated via one or more actuators. In such an example, the second, third, and fourth panels 210-214 may be rotatable up and/or down (drooped) relative to the first wing 104 via their respective actuation systems (and, thus, may be referred to as spoilers), while the first hinged panel 208 may only be rotatable downward from the first wing 104 with the first flap 202 (and, thus, may be referred to as a drooped panel).

Figure 3:
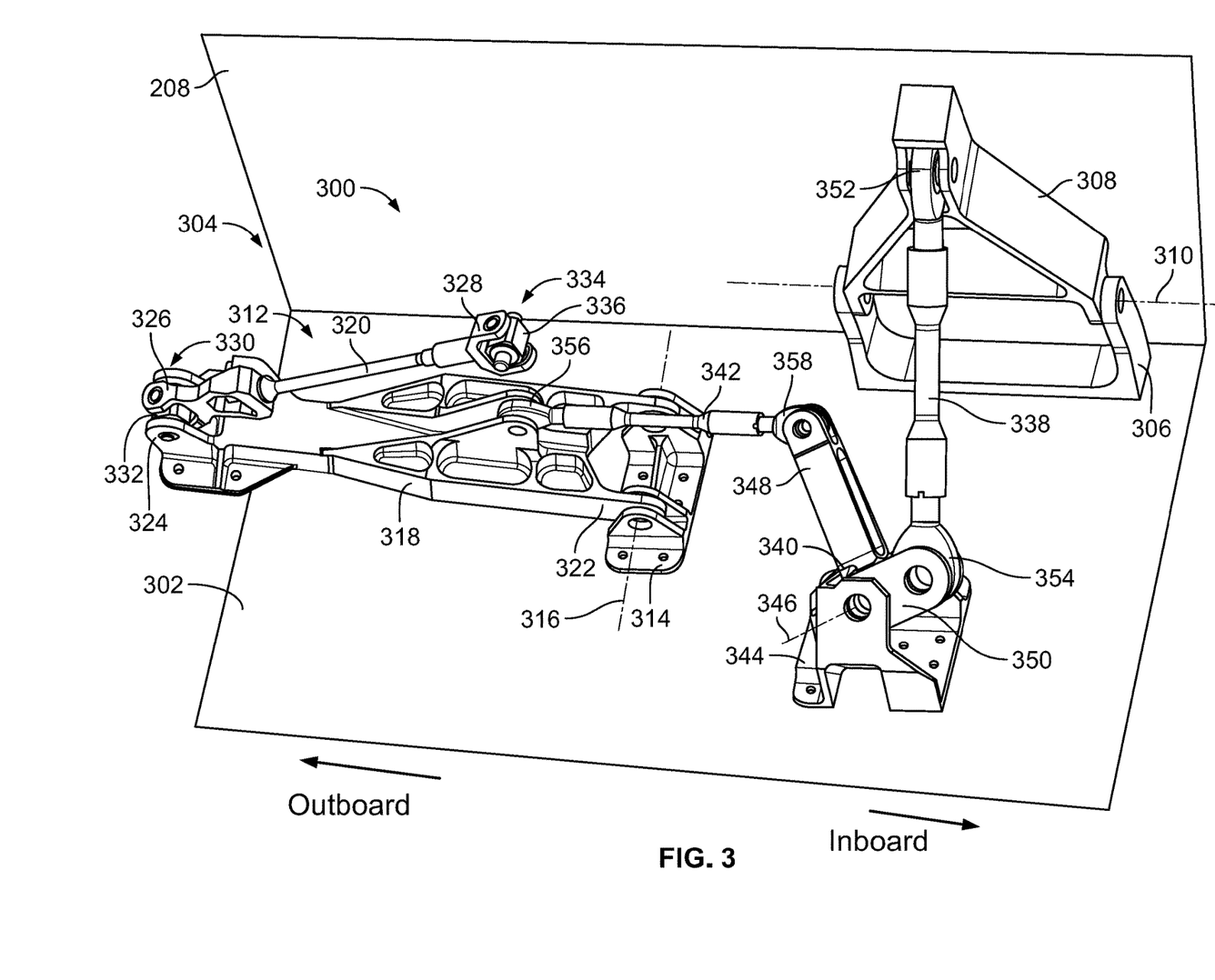
FIG. 3 is a bottom perspective view of an example linkage assembly employed on the example wing of FIG. 2 to operatively couple the example flap and the example hinged panel of FIG. 2.

FIG. 3 illustrates an example linkage assembly 300 constructed in accordance with the teachings of this disclosure. The example linkage assembly 300 can be used to couple the first hinged panel 208 and the first flap 202, for example. The linkage assembly 300 converts movement of the first flap 202 to movement in the first hinged panel 208, as shown in further detail herein. While the example linkage assembly 300 is described in connection with the first hinged panel 208, it is understood that the example linkage assembly 300 can be used to similarly couple any of the other hinged panels 210-214 to the first flap 202.

Figure 4A:
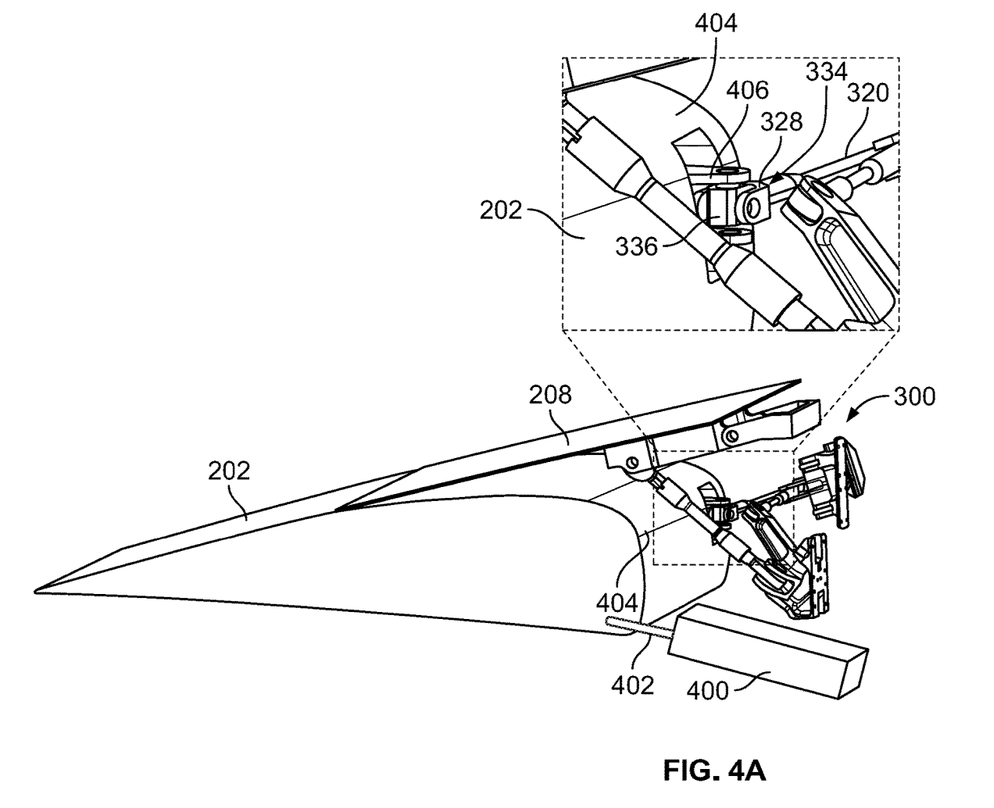
FIGS. 4A-4E illustrate an example sequence in which the example flap of FIG. 2 is deployed and the example linkage assembly of FIG. 3 lowers the example hinged panel.
Figure 4B:
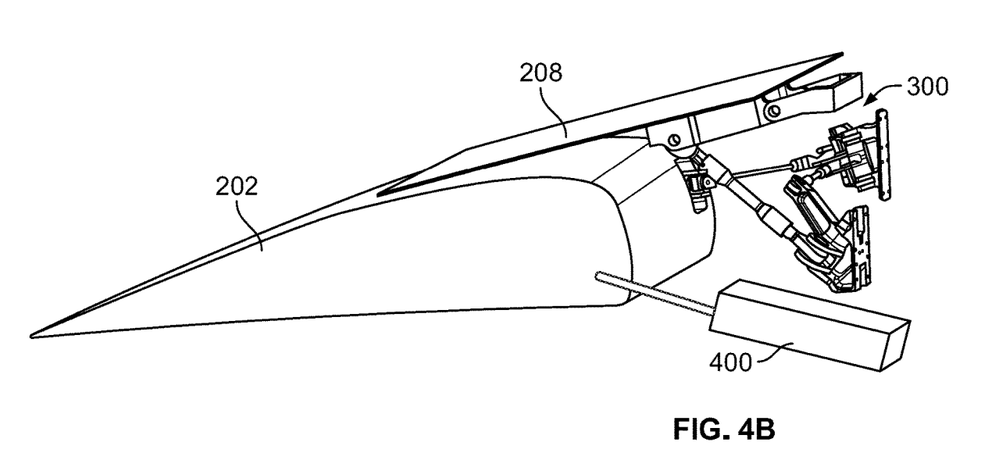
Figure 4C:
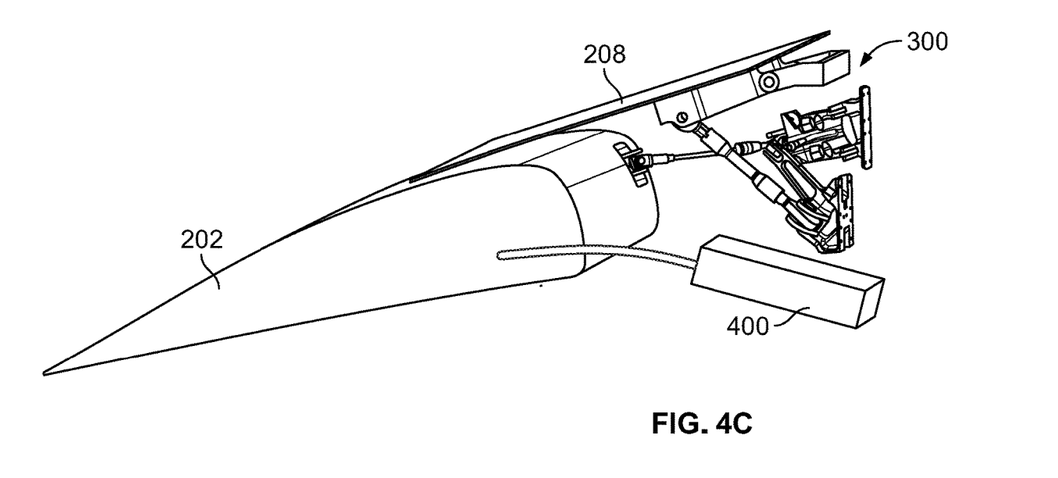
Figure 4D:
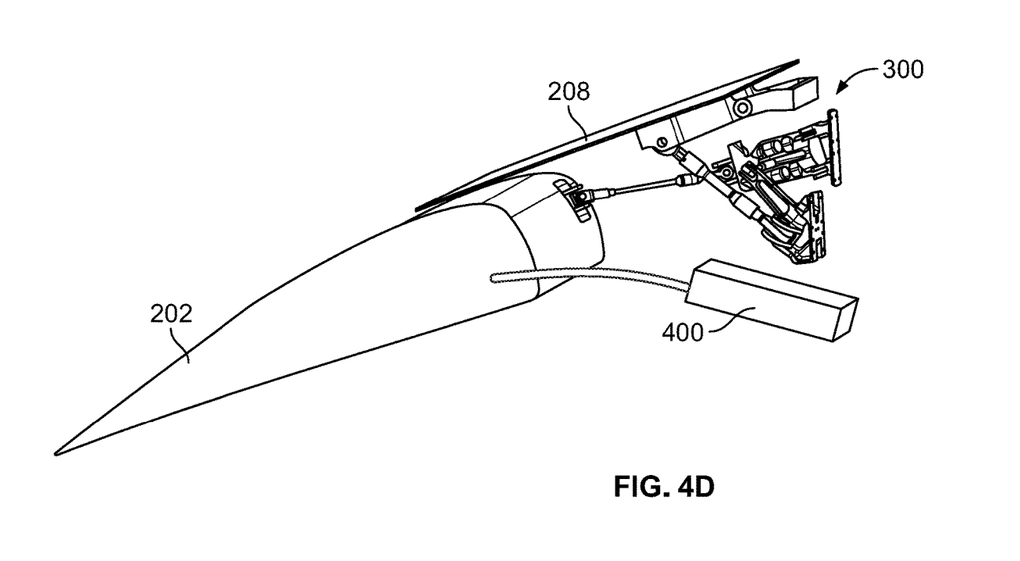

In the illustrated example, the linkage assembly 300 and the first hinged panel 208 are coupled to a spoiler support beam 302 of the fixed wing portion 200 (FIG. 2). In other examples, the linkage assembly 300 and/or the first hinged panel 208 can be coupled to another structure in the fixed wing portion 200, such as a rib, a rear spar, etc. The linkage assembly 300 is disposed in a cove 304, which is an area defined (vertically) as being below the hinged panels 208-214 and above the lower surface of the wing, and (fore/aft) as being between the spoiler support beam 302 and a fore end of the first flap 202 (e.g., the fore end 404 of FIG. 4A). In the illustrated example, a first bracket 306 is coupled to the spoiler support beam 302. A panel frame member 308 of the first hinged panel 208 is rotatably (e.g., hingeably) coupled to the first bracket 306 about a first axis 310. Thus, the first hinged panel 208 is rotatable about the first axis 310. The first hinged panel 208 is rotatable between an upward position (the position shown in FIG. 3) and a downward (drooped) position based on movement of the first flap 202 (FIG. 2), as shown in further detail herein.

In the illustrated example, the linkage assembly 300 includes a flap follower arm 312. The flap follower arm 312 is coupled between the spoiler support beam 302 and the first flap 202 (FIG. 2). The flap follower arm 312 is rotatably (e.g., hingeably) coupled to the spoiler support beam 302. In particular, a second bracket 314 is coupled to the spoiler support beam 302, and the flap follower arm 312 is rotatably coupled to the second bracket 314 about a second axis 316.

In the illustrated example, the flap follower arm 312 includes a link 318 and a swivel tie rod 320. The link 318 has a first end 322 and a second end 324 opposite the first end 322, and the swivel tie rod 320 has a first end 326 and a second end 328 opposite the first end 326. The first end 322 of the link 318 is rotatably (e.g., hingeably) coupled to the second bracket 314 and, thus, is rotatably coupled to the spoiler support beam 302. The swivel tie rod 320 is coupled between the second end 324 of the link 318 and the first flap 202 (shown in FIG. 4A). In this example, the first end 326 of the swivel tie rod 320 is coupled (rotatably coupled) to the second end 324 of the link 318 via a first universal joint (U-joint) 330. For example, the first end 326 of the swivel tie rod 320 is implemented as a first yoke, the second end 324 of the link 318 is implemented as a second yoke, and a cross-journal 332 (sometimes referred to as a spider) is disposed between the first and second yokes. The second end 328 of the swivel tie rod 320 is coupled (rotatably coupled) to a fore end of the first flap 202, as shown in further detail herein. In this example, the second end 328 of the swivel tie rod 320 is coupled to the first flap 202 via a second U-joint 334. For example, the second end 328 of the swivel tie rod 320 is implemented as a yoke, and a cross-journal 336 is disposed between the yoke and another yoke formed on the fore end of the first flap 202. The first and second U-joints 330, 334 enable the swivel tie rod 320 to be rotated about more than one axis relative to the link 318 and relative to the first flap 202. This is advantageous as the first flap 202 not only translates rearward, but also rotates downward along an arcuate path when being deployed. The swivel tie rod 320 also includes a swivel joint to accommodate axial rotation, as disclosed in further detail herein connection with FIG. 7.

In the illustrated example of FIG. 3, the linkage assembly 300 also includes a panel link 338 coupled to the panel frame member 308 of the first hinged panel 208. The panel link 338 may be moved generally toward or away from the first hinged panel 208 to rotate the first hinged panel 208 about the first axis 310. To transfer motion from the flap follower arm 312 to the panel link 338, the linkage assembly 300 includes a rocker 340 and a cross-bar link 342. The cross-bar link 342 is coupled between the flap follower arm 312 and the rocker 340, and the panel link 338 is coupled between the first hinged panel 208 (e.g., via the panel frame member 308) and the rocker 340.

In the illustrated example, the rocker 340 is rotatably coupled to the spoiler support beam 302. In particular, a third bracket 344 is coupled the spoiler support beam 302, and the rocker 340 is rotatably coupled to the third bracket 344 and rotates (e.g., pivots) about a third axis 346. In the illustrated example, the rocker 340 has a first arm 348 and a second arm 350. In the illustrated example, the first and second arms 348, 350 extend in different directions. In this example, the first and second arms 348, 350 are about 90° apart (e.g., perpendicular). In other examples, the first and second arms 348, 350 may be closer to or further apart from each other (e.g., 10°, 30°, 60°, 120°, etc.). In the illustrated example, the rocker 340 is rotatably coupled to the spoiler support beam 302 (e.g., via the third bracket 344) at an intersection of the first and second arms 348, 350. In this example, the first hinged panel 208 is rotatably coupled to the spoiler support beam 302 via the first bracket 306, the flap follower arm 312 is rotatably coupled to the spoiler support beam 302 via the second bracket 314, and the rocker 340 is rotatably coupled to the spoiler support beam 302 via the third bracket 344.

In the illustrated example of FIG. 3, the panel link 338 has a first end 352 rotatably coupled (e.g., via a spherical bearing) to the panel frame member 308 of the first hinged panel 208 and a second end 354, opposite the first end 352, rotatably coupled (e.g., via a spherical bearing) to the second arm 350 of the rocker 340. The panel link 338 is coupled at its first end 352 to an end of the panel frame member 308 that is at least a predetermined distance from the first axis 310 about which the panel frame member 308 is pivotally coupled to the panel spoiler support beam 302, wherein movement of the panel link 338 results in an applied force between the first end 352 of the panel link 338 and the end of the panel frame member 308, where a moment is established about the first axis 310 by the applied force at the predetermined distance from the first axis 310, such that the predetermined distance provides a mechanical advantage with respect to the applied force at the first end 352 of the panel link 338 and aerodynamic force applied to the first hinged panel 208 when rotated about the first axis 310. The cross-bar link 342 is coupled between the flap follower arm 312 and the rocker 340, which enables movement of the flap follower arm 312 to be transferred to the rocker 340. For example, the cross-bar link 342 has a first end 356 rotatably coupled (e.g., via a spherical bearing) to the link 318 and a second end 358, opposite the first end 356, rotatably coupled (e.g., via a spherical bearing) to the first arm 348 of the rocker 340.

In the illustrated example, the rocker 340 is rotatably coupled to the spoiler support beam 302 at a location that is inboard (closer to the fuselage 102 (FIG. 1)) from the flap follower arm 312. In particular, the flap follower arm 312 is rotatably coupled (via the second bracket 314) to the spoiler support beam 302 at a first location and the rocker 340 is rotatably coupled (via the third bracket 344) to the spoiler support beam 302 at a second location that is inboard from the first location. In other examples, the arrangement of the linkage assembly 300 may be reversed, such that the rocker 340 is rotatably coupled to the spoiler support beam 302 outboard of the flap follower arm 312. By having the flap follower arm 312 and the rocker 340 inboard or outboard relative to each other, the linkage assembly 300 is disposed in a more lateral orientation along the spoiler support beam 302, as opposed to a vertical orientation along a common chord of the wing as seen in known linkage assemblies. Further, the cross-bar link 342 extends in a longitudinal direction along the spoiler support beam 302. As a result, the linkage assembly 300 consumes less vertical space in the cove 304, which enables the linkage assembly 300 to be used in a thinner, lighter wing and/or a wing otherwise having a smaller cove.

Figure 4E:
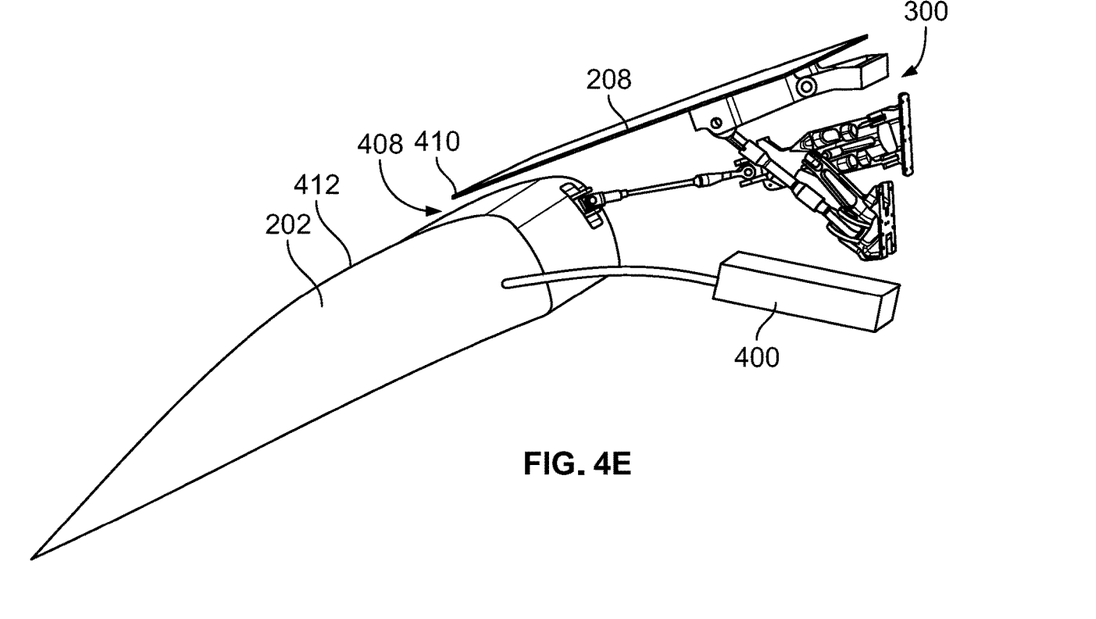
Figure 5A:
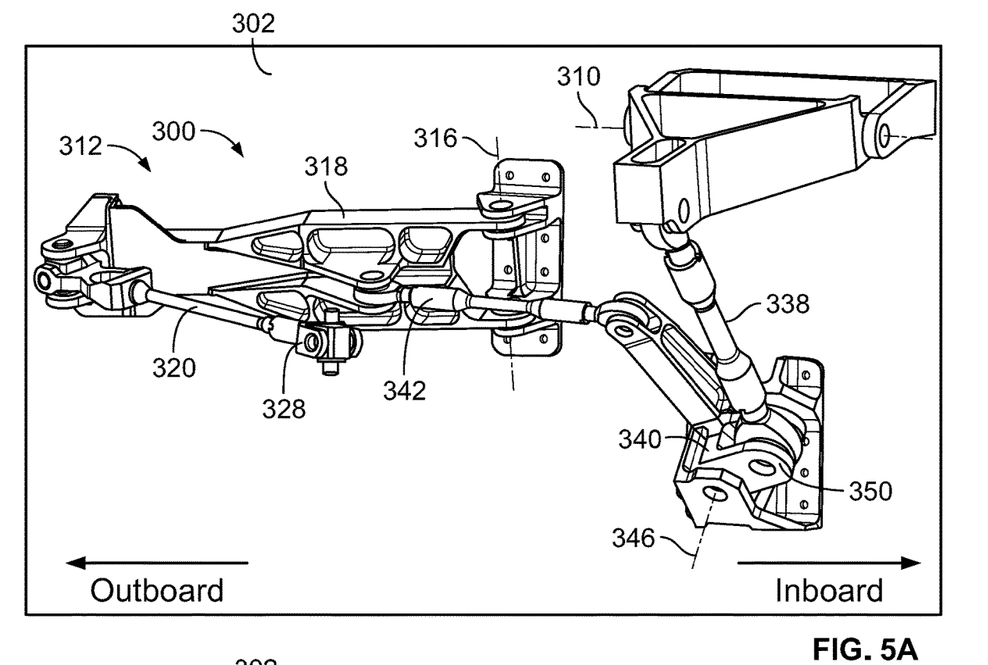
FIG. 5A-5E illustrate an example sequence of movement of the example linkage assembly of FIG. 3 that corresponds to the positions in FIGS. 4A-4E.
Figure 5B:
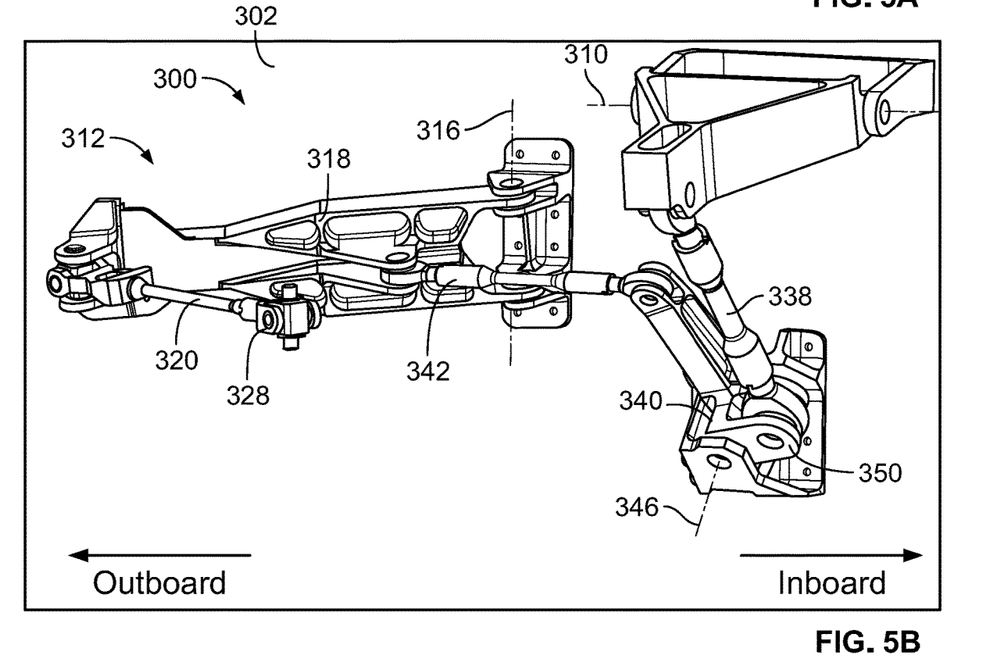
Figure 5C:
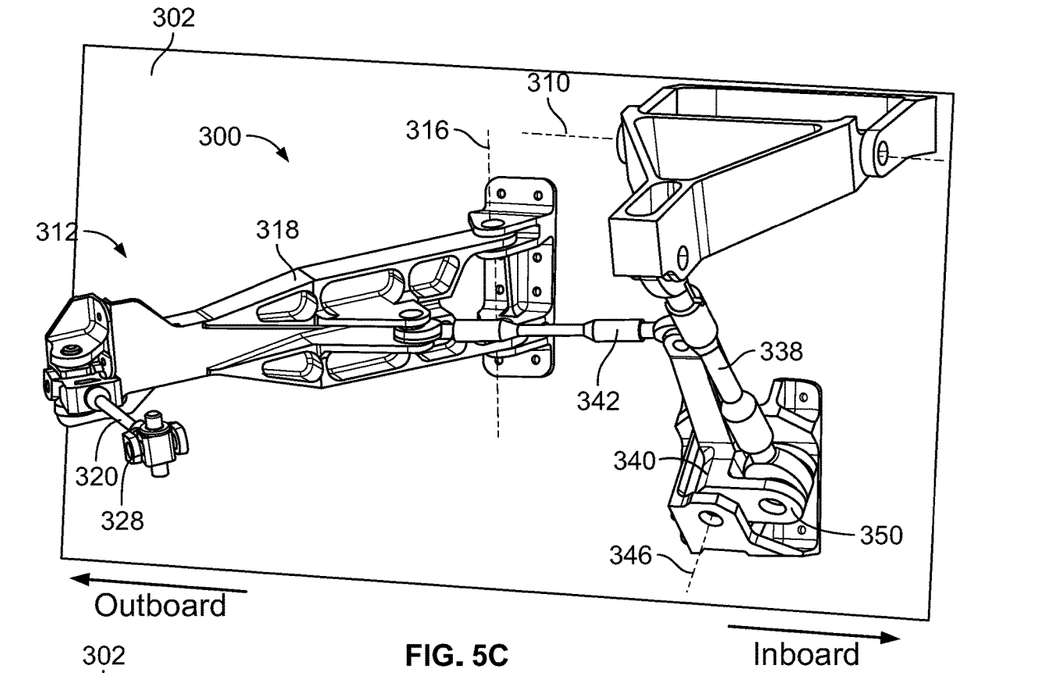
Figure 5D:
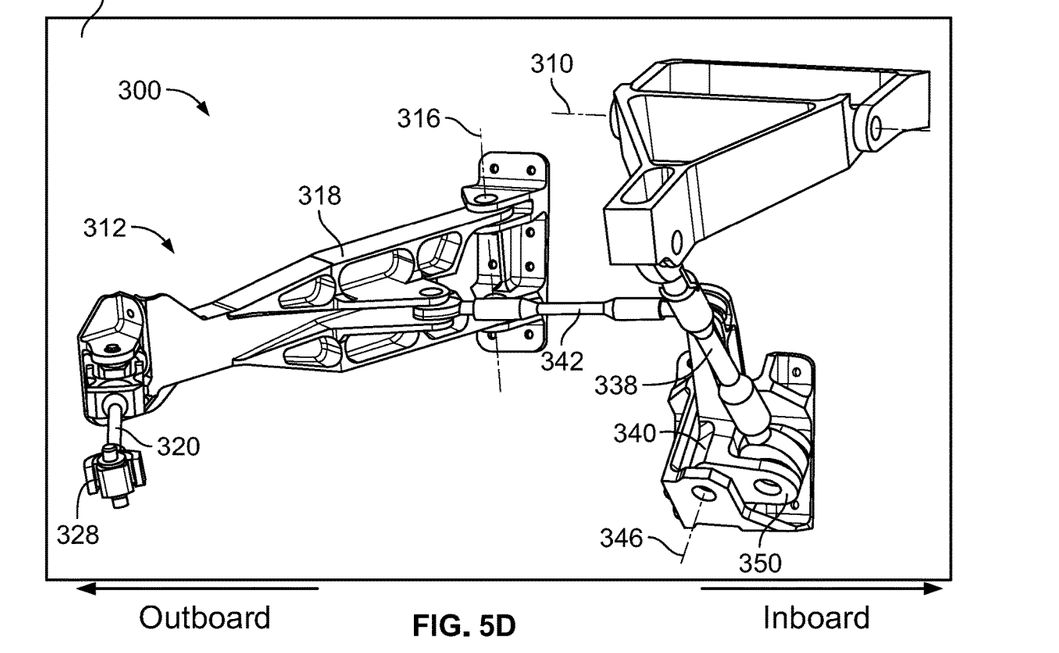
Figure 5E:
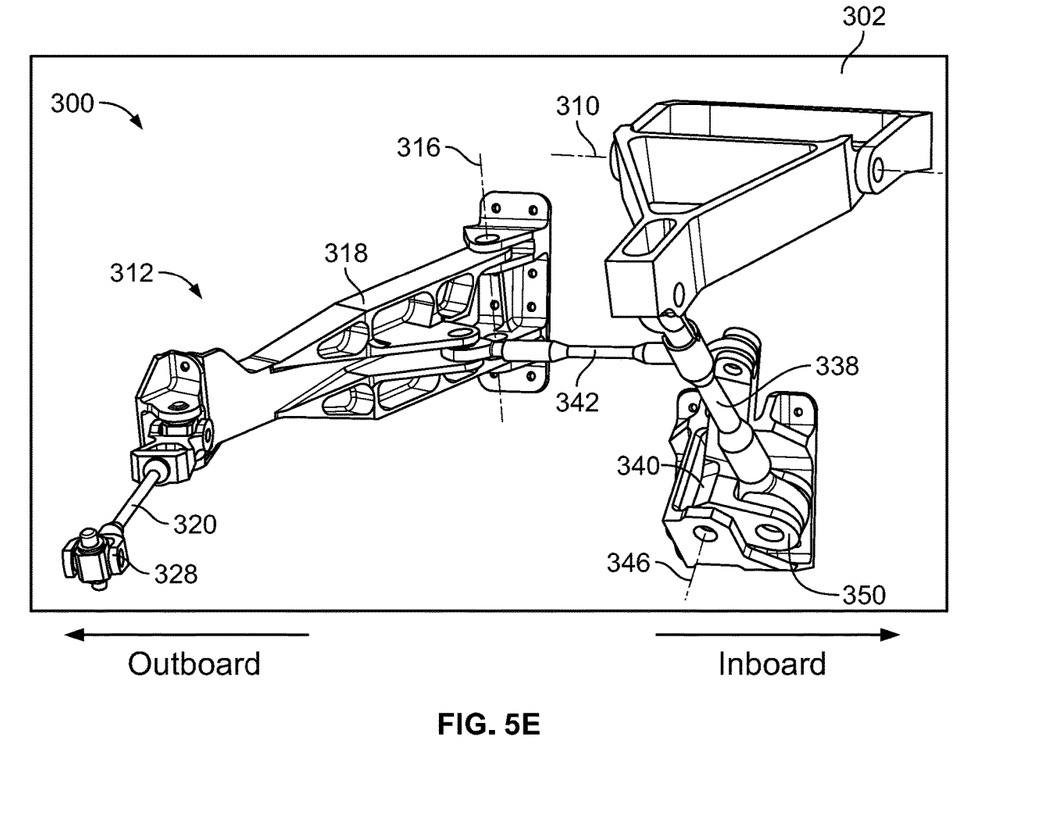

FIGS. 4A-4E show an example sequence in which the first flap 202 is moved from the stowed position (FIG. 4A) to the deployed position (FIG. 4E), which causes the first hinged panel 208 to rotate, via the linkage assembly 300, from the upward position (FIG. 4A) to the downward position (FIG. 4E). The spoiler support beam 302 (FIG. 3) is not shown in FIGS. 4A-4E for clarity. The first flap 202 is moveable via an actuator 400 between the stowed position and the deployed position. The actuator 400 can be coupled to the spoiler support beam 302 (FIG. 3) and/or another fixed structure in the first wing 104 (e.g., one or more ribs, a spar, etc.). The actuator 400 extends or retracts a rack 402 (labeled in FIG. 4A) that is coupled at or near a fore end 404 (FIG. 4A) of the first flap 202. When deploying the first flap 202, the actuator 400 translates the first flap 202 aft as well as rotates the first flap 202 downward. This motion is referred to a high-fowler flap motion. The actuator 400 may be any type of actuator such as, for example, a ball screw actuator. In other examples, other types of actuators and/or support systems may be implemented. As shown in the callout in FIG. 4A, the second end 328 of the swivel tie rod 320 (i.e., the end of the flap follower arm 312) is coupled to the fore end 404 of the first flap 202. In particular, in this example, the second end 328 of the swivel tie rod 320 (which is implemented as a yoke) is coupled to a yoke 406 on the fore end 404 of the first flap 202 via the cross journal 336, which forms the second U-joint 334.

As shown in FIGS. 4A-4E, as the first flap 202 is deployed via the actuator 400, the linkage assembly 300 rotates the first hinged panel 208 downward. When the actuator 400 retracts the first flap 202 back to the stowed position (FIG. 4A), the reverse sequence occurs, and the linkage assembly 300 rotates the first hinged panel 208 back to the upward position. As such, this arrangement does not employ an actuator to directly move or actuate the first hinged panel 208, thereby reducing the number of parts required in the aircraft 100 and reducing the overall weight of the aircraft 100. Instead, the first hinged panel 208 is moved indirectly through the actuator 400 that moves the first flap 202. In other words, the actuator 400 moves the first flap 202, which, through the linkage assembly 300, moves the first hinged panel 208. While this arrangement may add some additional load to the actuator 400, the load is relatively small, and the linkage assembly 300 uses mechanical advantage to convert the load to a larger load at the first hinged panel 208. In particular, the linkage assembly 300 converts the relatively large translational motion of the first flap 202 to a relatively small rotational motion in the hinged panel 208, which converts a smaller force or load on the first flap 202 to a larger load at the first hinged panel 208.

In the fully extended or deployed position shown in FIG. 4E, a gap 408 is formed between a trailing edge 410 of the first hinged panel 208 and a top surface 412 of the first flap 202. The gap 408 allows airflow between the first hinged panel 208 and the first flap 202. In other examples, the linkage assembly 300 may be configured to position the trailing edge 410 of the first hinged panel 208 closer to or further from the top surface 412 of the first flap 202.

FIGS. 5A-5E show an example sequence of the movement of the linkage assembly 300 when the first flap 202 is extended and the first hinged panel 208 is moved from the upward position to the downward position. The positions of the linkage assembly 300 in FIGS. 5A-5E generally correspond to the respective positions of the linkage assembly 300 in FIGS. 4A-4E. The first flap 202 and the first hinged panel 208 are not shown in FIGS. 5A-5E for clarity. Only a portion of the spoiler support beam 302 is illustrated. However, it is understood that the spoiler support beam 302 may be extended further in the inboard or outboard directions.

When the first flap 202 is extended by the actuator 400 (FIG. 4A), the second end 328 of the swivel tie rod 320 is pulled aft (away from the spoiler support beam 302) and downward by the first flap 202. As shown in FIGS. 5A-5E, this motion causes the flap follower arm 312 to unfold and extend aft away from spoiler support beam 302. As such, the link 318 of the flap follower arm 312 rotates about the second axis 316. As the link 318 rotates, the link 318 pushes the cross-bar link 342 (to the right in FIGS. 5A-5E), thereby rotating the rocker 340 (to the right in FIGS. 5A-5E). The rocker 340 rotates (e.g., pivots) about the third axis 346. The second arm 350 of the rocker 340 is rotated downward and/or generally away from the first hinged panel 208, which pulls the panel link 338 in the same direction, thereby rotating the first hinged panel 208 downward about the first axis 310. When the first flap 202 is moved back to the stowed position, the reverse of this sequence occurs. Thus, the flap follower arm 312, the rocker 340, the panel link 338, and the cross-bar link 342 are configured to coordinate adjustment of positions of the first hinged panel 208 and the first flap 202 relative to each other. The linkage assembly 300 creates mechanical advantage that converts a relatively large motion and small force of the first flap 202 to a smaller motion and larger force at the first hinged panel 208.

As shown in FIGS. 5A-5E, as the first flap 202 is moved between the stowed position and the deployed position, at least a portion of the flap follower arm 312 moves in an inboard or outboard direction. For example, when the first flap 202 is moved from the stowed position to the deployed position (as shown in the sequence from FIG. 5A to 5E), the link 318 rotates in an inboard direction (i.e., toward the fuselage 102 (FIG. 1)). Additionally, as the first flap 202 is moved between the stowed position and the deployed position, the cross-bar link 342 moves inboard or outboard along the spoiler support beam 302 (e.g., the cross-bar link 342 moves inboard when deploying the first flap 202, and the cross-bar link 342 moves outboard when retracting the first flap 202). As such, at least a portion of the motion of the linkage assembly 300 is lateral (inboard or outboard), thereby reducing the vertical space needed to accommodate the linkage assembly 300. Therefore, the example linkage assembly 300 can be advantageously employed in very limited space as formed by a thinner wing, unlike known linkage assemblies. As such, the linkage assembly 300 enables high-fowler flap motion to be implemented in thinner wings that would otherwise not be achievable with known linkage assemblies that require significant vertical space.

While in the illustrated example the flap follower arm 312 includes two components (the link 318 and the swivel tie rod 320), in other examples, the flap follower arm 312 may include more than two components (e.g., one or more additional links). Further, lengths of the link 318 and the swivel tie rod 320 can be changed depending on the overall travel of the first flap 202 between the stowed position and the deployed position. Similarly, the cross-bar link 342 and the panel link 338 can be constructed of more than one component. Further, any of the lengths and/or connection points of the panel link 338, the first and second arms 348, 350, and/or the cross-bar link 342 can be changed to affect the overall travel and/or force transmitted to the first hinged panel 208. In some examples, the lengths of the swivel tie rod 320, the panel link 338, and/or the cross-bar link 342 may be adjustable for rigging purposes. For example, with reference to the panel link 338, the first and second ends 352 (e.g., the spherical bearing ends) may be threadably coupled to a middle section or shaft. The shaft and/or the first or second sends 352, 354 may be rotated to increase or decrease the overall length of the panel link 338. The swivel tie rod 320 and/or the cross-bar link 342 may be similarly adjusted.

Figure 6A:
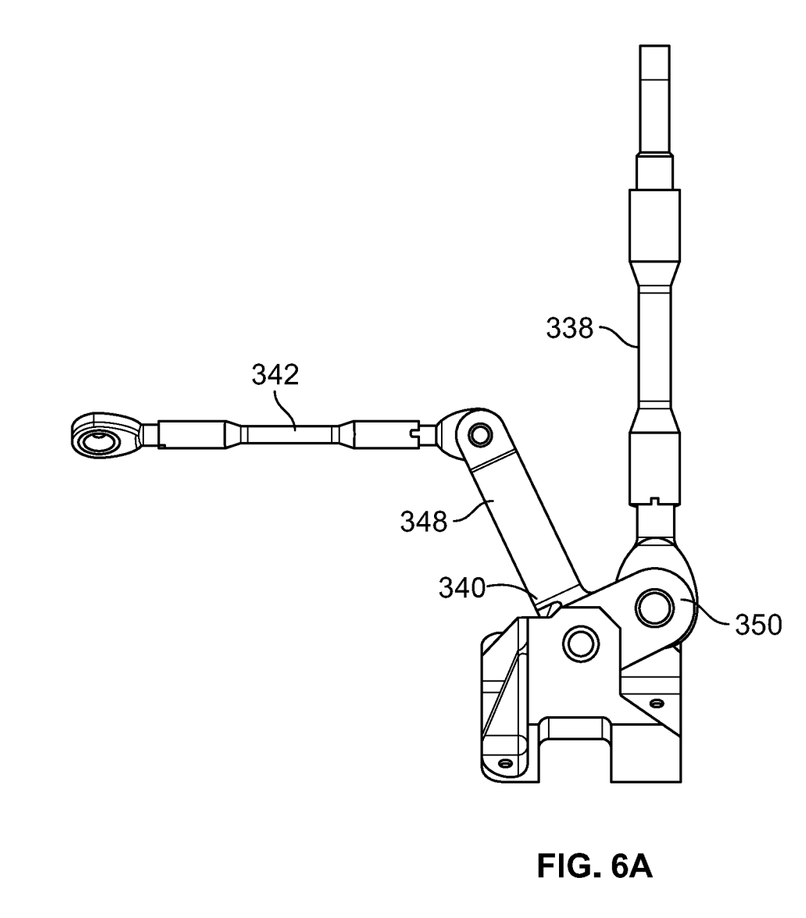
FIGS. 6A and 6B are bottom views of an example rocker of the example linkage assembly of FIG. 3 when the example flap is in a stowed position and a deployed position, respectively.
Figure 6B:
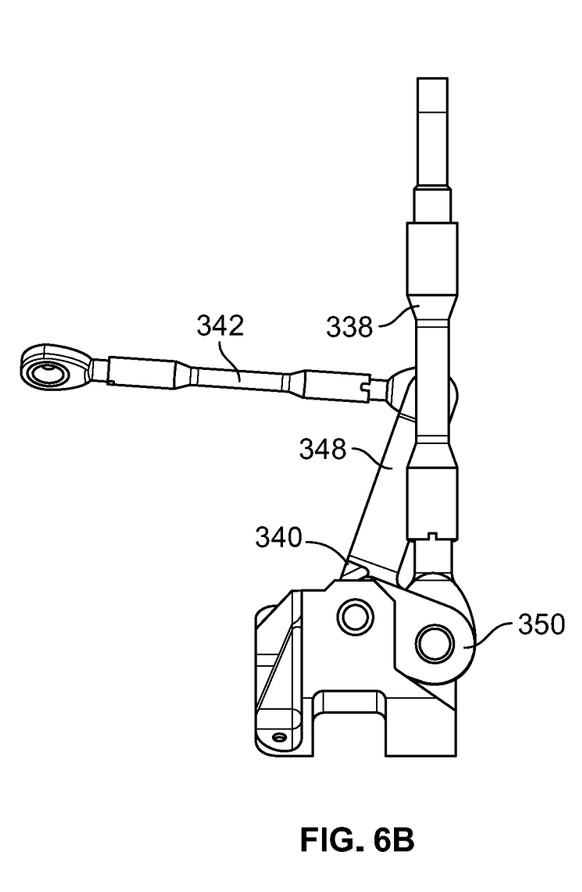

FIGS. 6A and 6B are bottom views of the rocker 340 when the first flap 202 (FIG. 4A) is in the stowed position and the deployed position, respectively. When the first flap 202 is being extended, the cross-bar link 342 moves toward the rocker 340 (to the right in FIGS. 6A and 6B), which pushes the first arm 348 of the rocker 340, thereby rotating the rocker 340 (in the clockwise direction in FIGS. 6A and 6B). As a result, the second arm 350 of the rocker 340 is rotated downward and/or generally away from the first hinged panel 208, which pulls the panel link 338 in the same direction, thereby rotating the first hinged panel 208 downward. When the first flap 202 is being retracted, the cross-bar link 342 is pulled away from the rocker 340 (to the left in FIGS. 6A and 6B), which pulls the first arm 348 of the rocker, thereby rotating the rocker 340 in the opposite direction (the counter-clockwise direction). As a result, the second arm 350 of the rocker 340 is rotated upward and/or towards the first hinged panel 208, which pushes the panel link 338 upward, thereby rotating the first hinged panel 208 upward. In the illustrated example, the first arm 348 is longer than the second arm 350. As such, a larger angular rotation in the first arm 348 (provided from the first flap 202) is converted to smaller angular rotation in the second arm 350 (provided to the first hinged panel 208). In one exemplary embodiment, the first arm 348 is at least about twice as long as the second arm 350, wherein a force applied at the end of the first arm 348 (via the cross-bar link 342 coupled to the flap follower arm 312) results in a moment about the third axis 346 produced by a given force applied about the first arm length from the third axis 310. Correspondingly, an associated force at the end of the second arm 350 is established by said moment, where the moment resulting from a given force applied about the first arm length (which is twice the second arm length) corresponds application about the second arm length of an associated force, such that the associated force applied at the end of the second arm 350 is twice the given force applied at the end of the first arm 348. Accordingly, where the rocker 340 has the first arm 348 that is longer than the second arm 350, a force applied via the cross-bar link 342 to the first arm 348 results in a greater force applied at the second arm 350 to the panel link 338, thereby providing a mechanical advantage between the flap follower arm 312 and cross-bar link 342 and the panel link 338 and the first hinged panel 208. However, in other examples the relative lengths of the first and second arms 348, 350 may be different.

Figure 7:
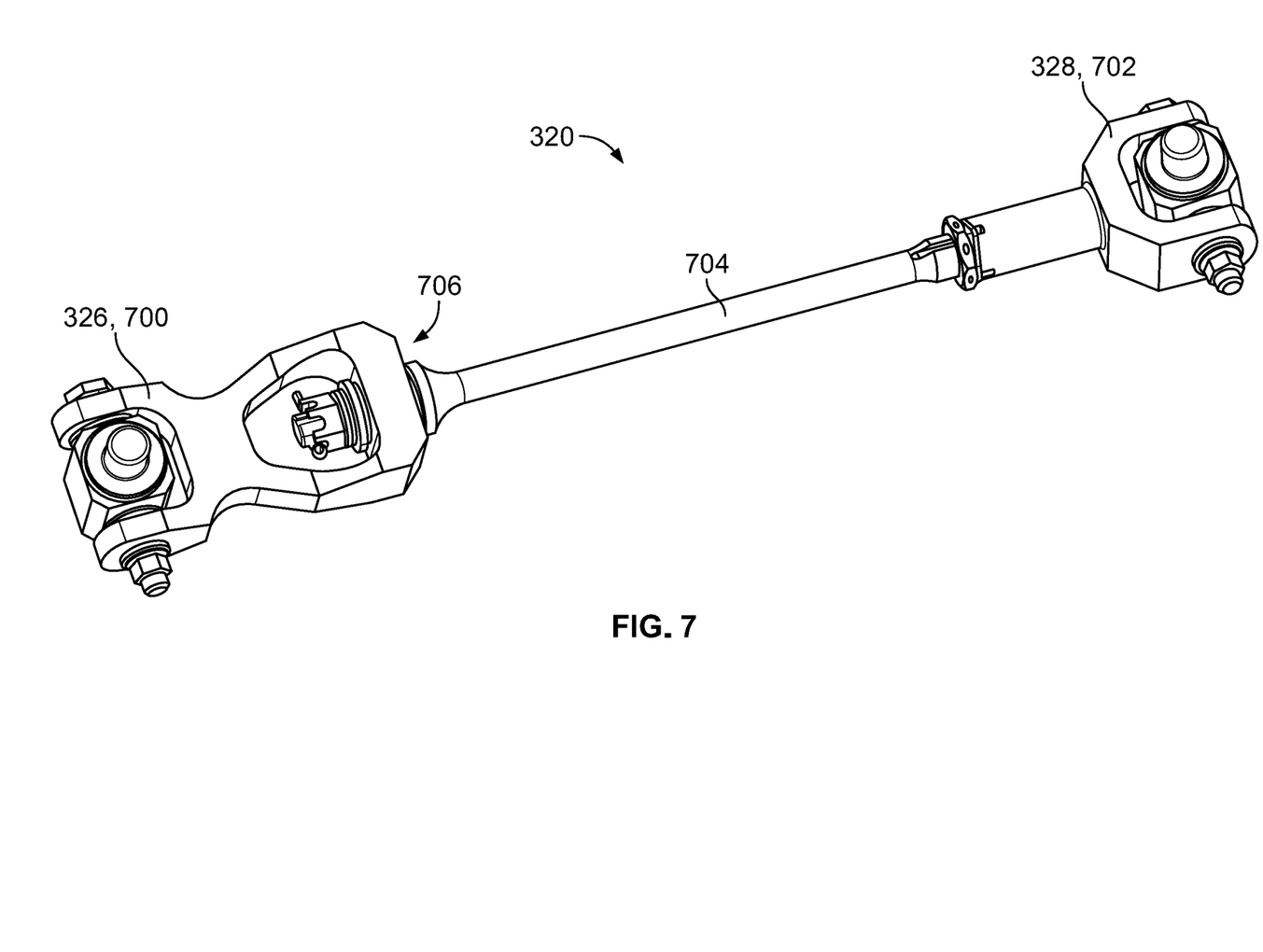
FIG. 7 is an isolated view of an example swivel tie rod of the example linkage assembly of FIG. 3.

FIG. 7 is an isolated view of the swivel tie rod 320. In the illustrated example, the swivel tie rod 320 includes a first yoke 700 forming the first end 326 and a second yoke 702 forming the second end 328. The first and second yokes 700, 702 are coupled by a shaft 704. In the illustrated example, the swivel tie rod 320 has a swivel joint 706 between the first yoke 700 and the shaft 704, which enables the second yoke 702 to rotate about a longitudinal axis of the shaft 704. This degree of freedom enables the swivel tie rod 320 to accommodate the translational and rotational motions of the first flap 202. In this example, the second yoke 702 is rigidly or non-rotatably coupled to the shaft 704. However, in other examples, the second yoke 702 may be rotatably coupled to the shaft 704, in addition to or as an alternative to the swivel joint 706 between the first yoke 700 and the shaft 704.

Figure 8:
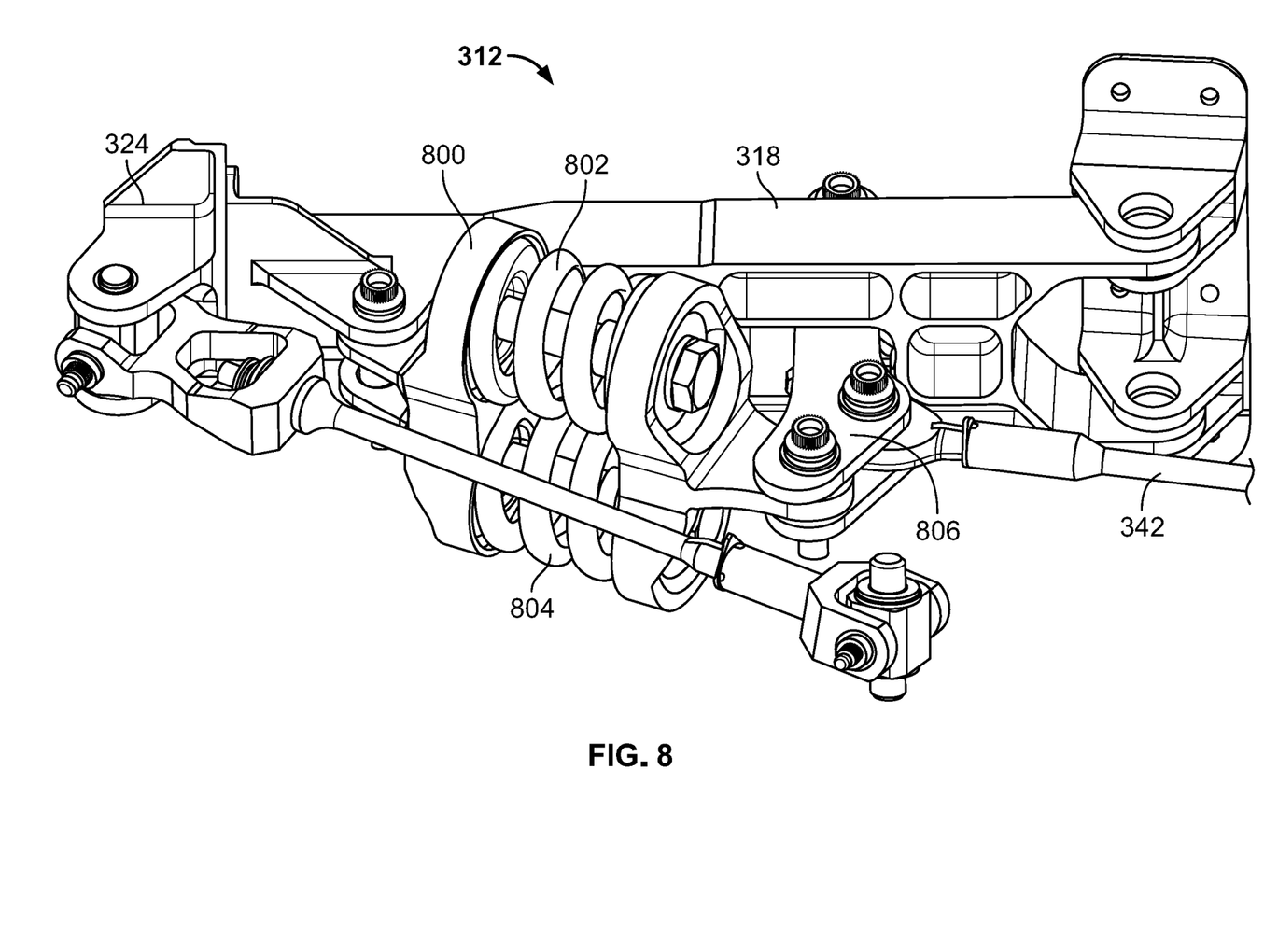
FIG. 8 illustrates an example spring pack that may be implemented in connection with the example linkage assembly of FIG. 3.

In some examples, the linkage assembly 300 may incorporate one or more relief features, such as one or more springs, to absorb large unexpected forces or deflections of the first flap 202 or the first hinged panel 208. For example, FIG. 8 illustrates an example in which the flap following arm 312 of the linkage assembly 300 includes a spring pack 800 having a first spring 802 and a second spring 804. In other examples, the spring pack 800 may include only one spring or may include more than two springs. In the illustrated example, a strut 806 is rotatably coupled to the link 318 of the flap follower arm 312. The spring pack 800 is coupled between the link 318 (e.g., near the second end 324) and the strut 806. In this example, the cross-bar link is rotatably coupled to the strut 806 instead of directly to the link 318. Each of the first and second springs 802, 804 have a relatively high spring constant, such that under normal operation, the first and second springs 802, 804 do not deflect. As such, under normal operation, the spring pack 800 acts as a rigid member in the linkage. However, should a relatively high, instantaneous force (e.g., a shock) or an unintended translational deflection be imparted on the first flap 202 and/or the first hinged panel 208 (e.g., from a high gust of wind pushing either surface), the spring pack 800 compresses to allow the first flap 202 and the first hinged panel 208 to move independent of each other, thereby preventing potential damage to the linkage from excessive loading. Thus, the spring pack 800 operates to absorb excessive loads between the flap follower arm 312 and the cross-bar link 342. While in this example a relief feature is included between the flap follower arm 312 and the cross-bar link 342, in other examples, one or more relief features (e.g., one or more springs) may be similarly implemented between two or more other components of the linkage (e.g., between the cross-bar link 342 and the rocker 340, between the rocker 340 and the panel link 338, between the panel link 338 and the panel frame member 308, etc.).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. The use of the terms "first," "second," "third," etc. in connection with any elements (e.g., brackets, axes, etc.) is merely used to distinguish one element from another element. These terms are non-limiting and are not intended to indicate a specific sequence or specific number of the elements. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example linkage assemblies have been disclosed that consume less vertical space in a wing while still slaving the motion of a hinged panel to the relatively large motion of a fowler flap. By consuming less vertical space, the example linkage assemblies can be utilized in connection with thinner wings having limited space, thereby enabling high-fowler flap motion to be implemented in connection with thinner wings, which creates more efficient flight.

The following paragraphs provide various examples of the examples disclosed herein.

Example 1 includes a linkage assembly for coupling a hinged panel of an aircraft wing and a flap of the aircraft wing. The linkage assembly comprises a flap follower arm coupled between a spoiler support beam and the flap, a rocker, a panel link coupled between the hinged panel and the rocker, and a cross-bar link coupled between the flap follower arm and the rocker. The flap follower arm, the cross-bar link, the rocker, and the panel link are configured to coordinate adjustment of positions of the hinged panel and the flap relative to each other as the flap is moved.

Example 2 includes the linkage assembly of Example 1, wherein the rocker is rotatably coupled to the spoiler support beam.

Example 3 includes the linkage assembly of Example 2, wherein the rocker is rotatably coupled to the spoiler support beam inboard or outboard of the flap follower arm.

Example 4 includes the linkage assembly of Example 3, wherein the cross-bar link extends in a longitudinal direction along the spoiler support beam.

Example 5 includes the linkage assembly of any of Examples 2-4, wherein the rocker includes a first arm and a second arm, and wherein the cross-bar link is coupled to the first arm and the panel link is coupled to the second arm.

Example 6 includes the linkage assembly of Example 5, wherein the rocker is rotatably coupled to the spoiler support beam at an intersection of the first and second arms.

Example 7 includes the linkage assembly of any of Examples 1-6, wherein the hinged panel is rotatably coupled to the spoiler support beam via a first bracket, the flap follower arm is rotatably coupled to the spoiler support beam via a second bracket, and the rocker is rotatably coupled to the spoiler support beam via a third bracket.

Example 8 includes the linkage assembly of any of Examples 1-7, wherein the flap follower arm includes a link and a swivel tie rod, wherein the link has a first end and a second end opposite the first end, wherein the first end of the link is rotatably coupled to the spoiler support beam, and wherein the swivel tie rod is coupled between the second end of the link and the flap.

Example 9 includes the linkage assembly of Example 8, wherein the swivel tie rod has a first end and a second end opposite the first end, the first end of the swivel tie rod is coupled to the second end of the link via a first universal joint (U-joint), and the second end of the swivel tie rod is coupled to the flap via a second U-joint.

Example 10 includes the linkage assembly of Example 9, wherein the swivel tie rod includes a swivel joint between a yoke forming the second U-joint and a shaft of the swivel tie rod to enable the yoke to rotate about a longitudinal axis of the shaft.

Example 11 includes the linkage assembly of any of Examples 1-10, wherein the flap follower arm includes a spring pack between the flap follower arm and the cross-bar link.

Example 12 includes an aircraft wing comprising a fixed wing portion having a spoiler support beam, a flap moveably coupled to the fixed wing portion, the flap moveable between a stowed position and a deployed position, a hinged panel rotatably coupled to the spoiler support beam, and a linkage assembly operatively coupling the flap and the hinged panel such that movement of the flap causes movement of the hinged panel. The linkage assembly includes a flap follower arm coupled between the spoiler support beam and the flap. At least a portion of the flap follower arm moves in an inboard or outboard direction as the flap is moved between the stowed position and the deployed position.

Example 13 includes the aircraft wing of Example 12, further including an actuator to move the flap between the stowed position and the deployed position.

Example 14 includes the aircraft wing of Examples 12 or 13, wherein the linkage assembly further includes a rocker, a cross-bar link coupled between the flap follower arm and the rocker, and a panel link coupled between the hinged panel and the rocker.

Example 15 includes the aircraft wing of Example 14, wherein the flap follower arm is rotatably coupled to the spoiler support beam at a first location, and the rocker is rotatably coupled to the spoiler support beam at a second location.

Example 16 includes the aircraft wing of Example 15, wherein the second location is inboard or outboard of the first location.

Example 17 includes the aircraft wing of any of Examples 14-16, wherein, as the flap is moved between the stowed position and the deployed position, the cross-bar link moves inboard or outboard along the spoiler support beam.

Example 18 includes an aircraft comprising a wing including, a spoiler support beam, a flap, a hinged panel rotatably coupled to the spoiler support beam, and a linkage assembly operatively coupling the flap and the hinged panel. The linkage assembly includes a flap follower arm coupled to the spoiler support beam, a rocker coupled to the spoiler support beam inboard or outboard of the flap follower arm, a cross-bar link coupled between the flap follower arm and the rocker, and a panel link coupled between the rocker and the hinged panel.

Example 19 includes the aircraft of Example 18, wherein the flap follower arm is coupled between the spoiler support beam and a fore end of the flap. The flap follower arm includes a link and a swivel tie rod.

Example 20 includes the aircraft of Examples 18 or 19, wherein, as the flap is moved between a stowed position and a deployed position, the cross-bar link moves inboard or outboard along the spoiler support beam.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A linkage assembly for coupling a hinged panel of an aircraft wing and a flap of the aircraft wing, the linkage assembly comprising:
    a flap follower arm coupled between a spoiler support beam and the flap;
    a rocker rotatable about an axis, the rocker including a first arm and a second arm, the first arm extending in a first direction and the second arm extending in a second direction;
    a panel link coupled between the hinged panel and the rocker; and
    a cross-bar link having a first end and a second, the first end of the cross-bar link coupled to the flap follower arm, the second end of the cross-bar link coupled to the rocker, and wherein the flap follower arm, the cross-bar link, the rocker, and the panel link are configured to coordinate adjustment of positions of the hinged panel and the flap relative to each other as the flap is moved and such that movement of the flap causes movement of the hinged panel.

2. The linkage assembly of claim 1, wherein the rocker is rotatably coupled to the spoiler support beam.

3. The linkage assembly of claim 2, wherein the rocker is rotatably coupled to the spoiler support beam inboard or outboard of the flap follower arm.

4. The linkage assembly of claim 3, wherein the cross-bar link extends in a longitudinal direction adjacent the spoiler support beam.

5. The linkage assembly of claim 2, wherein the second end of the cross-bar link is coupled to the first arm and the panel link is coupled to the second arm.

6. The linkage assembly of claim 5, wherein the rocker is rotatably coupled to the spoiler support beam at an intersection of the first and second arms.

7. The linkage assembly of claim 1, wherein the hinged panel is rotatably coupled to the spoiler support beam via a first bracket, the flap follower arm is rotatably coupled to the spoiler support beam via a second bracket, and the rocker is rotatably coupled to the spoiler support beam via a third bracket.

8. The linkage assembly of claim 1, wherein the flap follower arm includes a link and a swivel tie rod, wherein the link has a first end and a second end opposite the first end, wherein the first end of the link is rotatably coupled to the spoiler support beam, and wherein the swivel tie rod is coupled between the second end of the link and the flap.

9. The linkage assembly of claim 8, wherein the swivel tie rod has a first end and a second end opposite the first end, the first end of the swivel tie rod is coupled to the second end of the link via a first universal joint (U-joint), and the second end of the swivel tie rod is coupled to the flap via a second U-joint.

10. A linkage assembly for coupling a hinged panel of an aircraft wing and a flap of the aircraft wing, the linkage assembly comprising:
    a flap follower arm coupled between a spoiler support beam and the flap, the flap follower arm including a link and a swivel tie rod, the link having a first end and a second end opposite the first end, the first end of the link rotatably coupled to the spoiler support beam, the first end of the swivel tie rod coupled to the second end of the link via a first universal joint (U-joint), the second end of the swivel tie rod coupled to the flap via a second U-joint, wherein the swivel tie rod includes a swivel joint between the yoke forming the first U-joint and a shaft of the swivel tie rod to enable a second yoke forming the second U-joint to rotate about a longitudinal axis of the shaft;
    a rocker rotatable about an axis, the rocker including a first arm and a second arm, the first arm extending in a first direction and the second arm extending in a second direction;
    a panel link coupled between the hinged panel and the rocker; and
    a cross-bar link coupled between the flap follower arm and the rocker, the flap follower arm, the cross-bar link, the rocker, and the panel link being configured to coordinate adjustment of positions of the hinged panel and the flap relative to each other as the flap is moved.

11. The linkage assembly of claim 1, wherein the flap follower arm includes a spring pack between the flap follower arm and the cross-bar link.

12. The linkage assembly of claim 1, wherein the first arm of the rocker is perpendicular to the second arm of the rocker.

* * * * *